US012649391B2

(12) United States Patent
Cherukuvada et al.

(10) Patent No.: US 12,649,391 B2
(45) Date of Patent: Jun. 9, 2026

(54) ADJUSTABLE SEAT CUSHION INSERT

(71) Applicant: GM Global Technology Operations LLC, Detroit, MI (US)

(72) Inventors: Venkata Narasimha Rao Cherukuvada, Troy, MI (US); Jeremy Kelley, Brighton, MI (US); Yun Wu, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 18/354,149

(22) Filed: Jul. 18, 2023

(65) Prior Publication Data

US 2025/0026245 A1     Jan. 23, 2025

(51) Int. Cl.
  *B60N 2/02*         (2006.01)
  *B60N 2/90*         (2018.01)
(52) U.S. Cl.
  CPC ..... *B60N 2/02* (2013.01); *B60N 2/90* (2018.02)
(58) Field of Classification Search
  CPC .................................. B60N 2/02; B60N 2/90
  USPC ................................................... 297/284.11
  See application file for complete search history.

(56) References Cited

U.S. PATENT DOCUMENTS 3,940,181 A     2/1976  Cheek, Jr.
5,988,749 A    11/1999  Williams

| 8,998,320 B2 * | 4/2015 | Mankame ............ B60N 2/0273 |
| | | 297/284.11 X |
| 2004/0080200 A1 | 4/2004 | Golynsky |
| 2006/0071450 A1 | 4/2006 | Wu |
| 2007/0024095 A1 | 2/2007 | Chen |
| 2016/0135602 A1 | 5/2016 | Smith |
| 2024/0131968 A1 | 4/2024 | Schergun et al. |

FOREIGN PATENT DOCUMENTS

| DE | 3139945 A1 | 4/1983 |
| DE | 102011078306 A1 | 1/2013 |
| DE | 202021100742 U1 | 5/2022 |
| JP | S5639927 A | 4/1981 |
| JP | S5758523 A | 4/1982 |
| JP | S5819834 U | 2/1983 |
| JP | S63155461 U | 10/1988 |

OTHER PUBLICATIONS

German Application No. 10 2023 127 507.0 filed Oct. 9, 2023; German Office Action dated Jul. 8, 2024; 4 pages.

* cited by examiner

*Primary Examiner* — Anthony D Barfield
(74) *Attorney, Agent, or Firm* — CANTOR COLBURN LLP

(57)     ABSTRACT

A vehicle includes a seat assembly. The seat assembly includes a seat cushion, a cushion insert frame rotatably coupled to the seat cushion, and a locking device for engaging the cushion insert frame to the seat cushion and for disengaging the cushion insert frame from the seat cushion to allow for adjusting an angle of the cushion insert frame with respect to the seat cushion.

20 Claims, 12 Drawing Sheets

1500

1600

1800

1600

ADJUSTABLE SEAT CUSHION INSERT

INTRODUCTION

The subject disclosure relates to a seat assembly in a vehicle and, in particular, to a mechanism for adjusting a seat cushion insert of the seat assembly.

Seats in vehicles generally includes a seat cushion and a seat back. The seat cushion is a single component with non-moving parts. A person sitting in the seat may wish to have a cushion insert adjusted. For example, since seats are generally designed as a one-size-fits-all feature, some people might feel uncomfortable with a seat unless it can be adjusted. Accordingly, it is desirable to provide a mechanism for adjusting a cushion insert of the seat to improve comfort over a range of people and to allow for the proper installation of a child's seat.

SUMMARY

In one exemplary embodiment, a seat assembly for a vehicle is disclosed. The seat assembly includes a seat cushion, a cushion insert frame rotatably coupled to the seat cushion, and a locking device for engaging the cushion insert frame to the seat cushion and for disengaging the cushion insert frame from the seat cushion to allow for adjusting an angle of the cushion insert frame with respect to the seat cushion.

In addition to one or more of the features described herein, the seat cushion includes a bracket having a hole and the cushion insert frame includes a barrel having a pin and a spring that applies a biasing force against the barrel to engage the pin in the hole and a strap for applying a countering force on the barrel against the biasing force to disengage the pin from the hole. The barrel is disposed at an end of a rod coupled to the cushion insert frame and the spring is disposed between the barrel and the end of the rod. The seat assembly further includes a motor for applying the countering force at the strap. The seat cushion includes a bracket having a hole and the cushion insert frame includes a lever arm hingedly attached to the cushion insert frame, a spring that applies a biasing force against the lever arm to engage a pin of the lever arm in the hole, and a strap for applying a countering force on the lever arm against the biasing force to disengage the pin from the hole. The spring is disposed between an end of a rod coupled to the cushion insert frame and the lever arm. The seat assembly further includes a motor for applying the countering force at the strap. The seat assembly further includes a horizontal bar attached to a floor of the vehicle and a latch hingedly attached to the cushion insert frame, the latch including at least a first recess and a second recess for receiving the horizontal bar and a handle for locking the latch in place. The seat assembly further includes a horizontal bar attached to the cushion insert frame and a latch hingedly attached to a floor of the vehicle, the latch including at least a first recess and a second recess for receiving the horizontal bar and a handle for locking the latch in place. The locking device is disposed at a front end of the cushion insert frame.

In another exemplary embodiment, a vehicle is disclosed. The vehicle includes a seat cushion, a cushion insert frame rotatably coupled to the seat cushion, and a locking device for engaging the cushion insert frame to the seat cushion and for disengaging the cushion insert frame from the seat cushion to allow for adjusting an angle of the cushion insert frame with respect to the seat cushion.

In addition to one or more of the features described herein, the seat cushion includes a bracket having a hole and the cushion insert frame includes a barrel having a pin and a spring that applies a biasing force against the barrel to engage the pin in the hole and a strap for applying a countering force on the barrel against the biasing force to disengage the pin from the hole. The barrel is disposed at an end of a rod coupled to the cushion insert frame and the spring is disposed between the barrel and the end of the rod. The vehicle further includes a motor for applying the countering force at the strap. The seat cushion includes a bracket having a hole and the cushion insert frame includes a lever arm hingedly attached to the cushion insert frame, a spring that applies a biasing force against the lever arm to engage a pin of the lever arm in the hole, and a strap for applying a countering force on the lever arm against the biasing force to disengage the pin from the hole. The spring is disposed between an end of a rod coupled to the cushion insert frame and the lever arm. The vehicle further includes a motor for applying the countering force at the strap. The vehicle further includes a horizontal bar attached to a floor of the vehicle and a latch hingedly attached to the cushion insert frame, the latch including at least a first recess and a second recess for receiving the horizontal bar and a handle for locking the latch in place. The vehicle further includes a horizontal bar attached to the cushion insert frame and a latch hingedly attached to a floor of the vehicle, the latch including at least a first recess and a second recess for receiving the horizontal bar and a handle for locking the latch in place. The locking device is disposed at a front end of the cushion insert frame.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
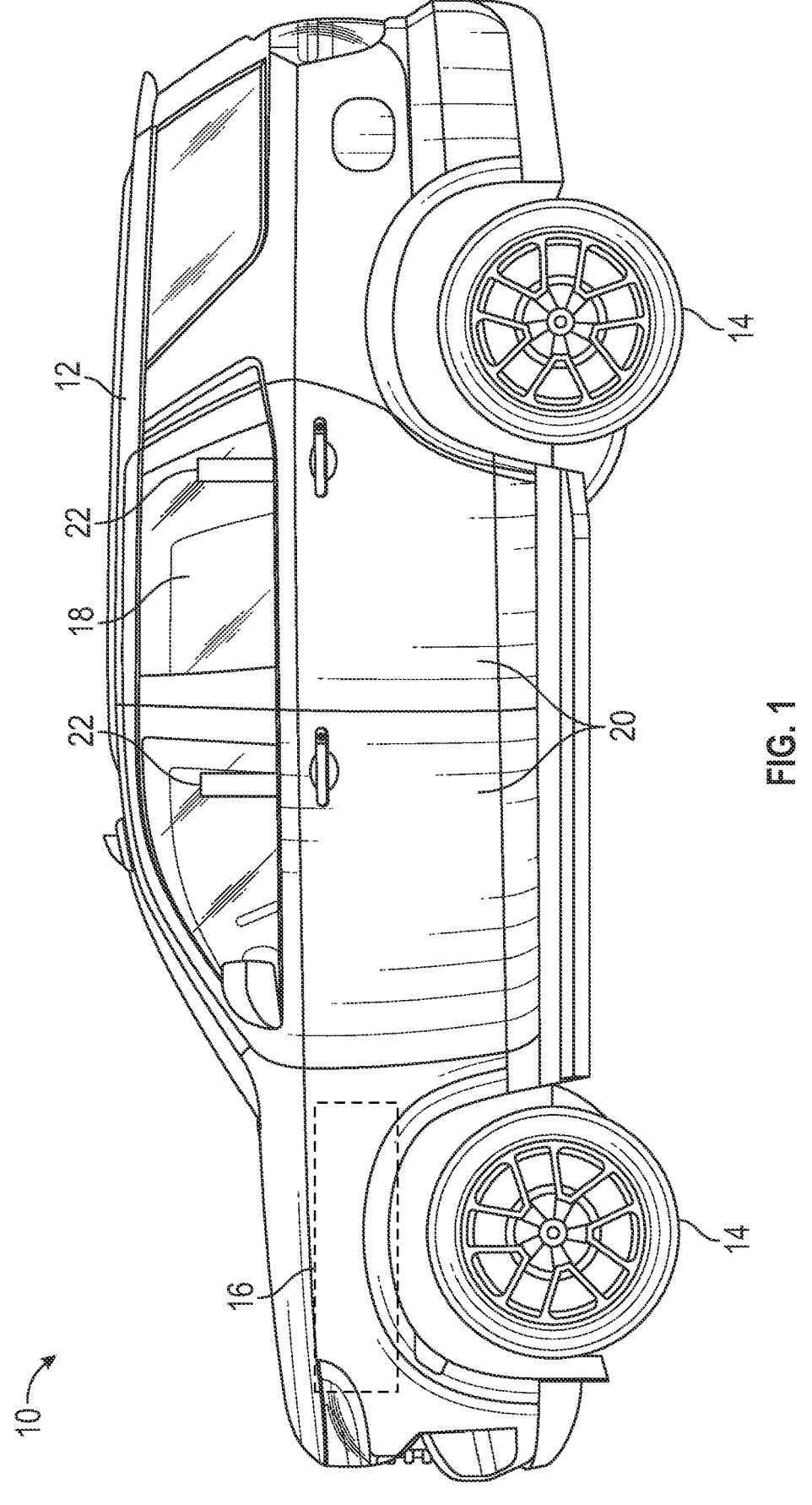
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a vehicle 10 is illustrated in FIG. 1. The vehicle 10 includes a vehicle body 12 supported by a plurality of wheels 14. A power system 16, such as an internal combustion engine, an electric motor, or a hybrid system is operably connected to the plurality of wheels 14 to drive the plurality of wheels 14. The vehicle body 12 defines an occupant compartment 18 inside of the vehicle body 12, and one or more doors 20 are provided for occupant entry and exit of the occupant compartment 18 by an occupant. A plurality of rows of seat assemblies 22 are positioned in the occupant compartment 18.

Figure 2:
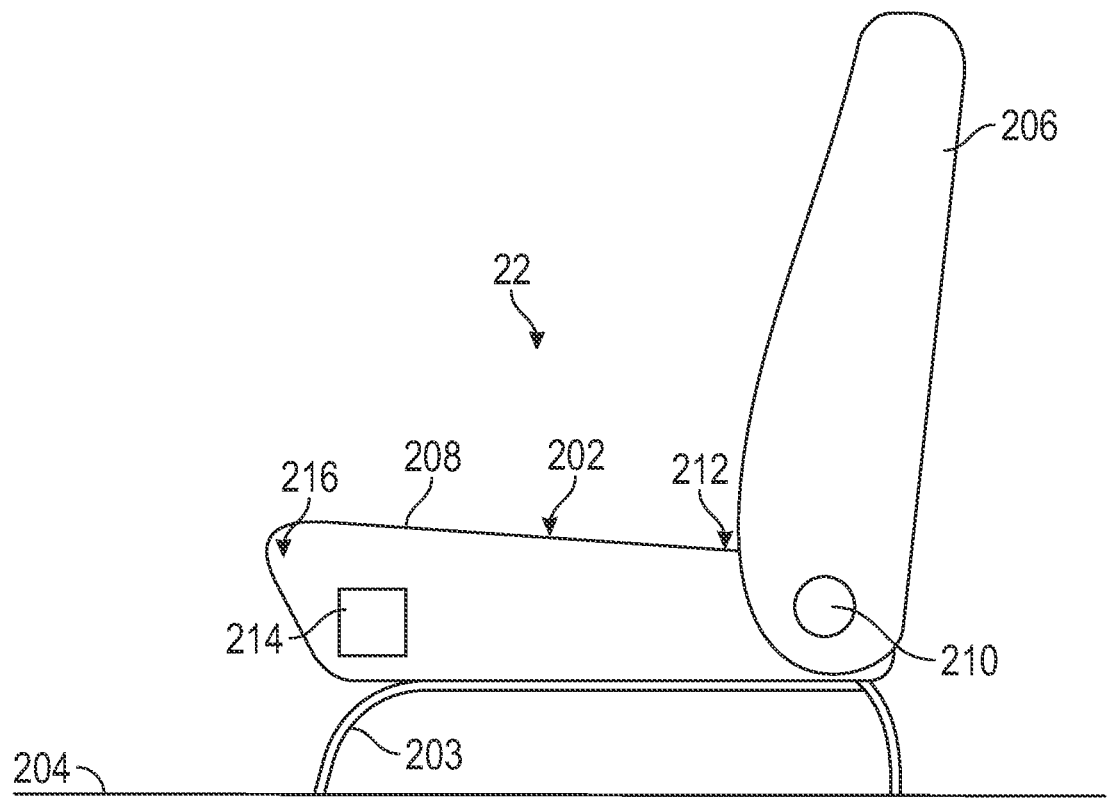
FIG. 2 shows a side view of a seat assembly of the vehicle in an illustrative embodiment.

FIG. 2 shows a side view 200 of a seat assembly 22 in an illustrative embodiment. The seat assembly 22 includes a seat cushion 202 attached to a floor 204 of the vehicle 10 and a seat back 206. The seat cushion 202 is attached to the floor 204 via a seat mount 203. The seat cushion 202 includes a cushion insert 208 that can be tilted with respect to the seat cushion 202. The cushion insert 208 is coupled to the seat cushion 202 at a hinge 210 located at a rear end 212 of the seat cushion 202. An adjuster mechanism 214 attaches the cushion insert 208 to a front end 216 of the seat cushion 202. The adjuster mechanism 214 is attached to the cushion insert 208 and allows the front end of the cushion insert 208 to be engaged to and/or disengaged from the front end 216 of the seat cushion 202. When disengaged, the cushion insert 208 can be rotated about the hinge 210 to adjust the angle of the cushion with respect to the seat cushion 202.

Figure 3:
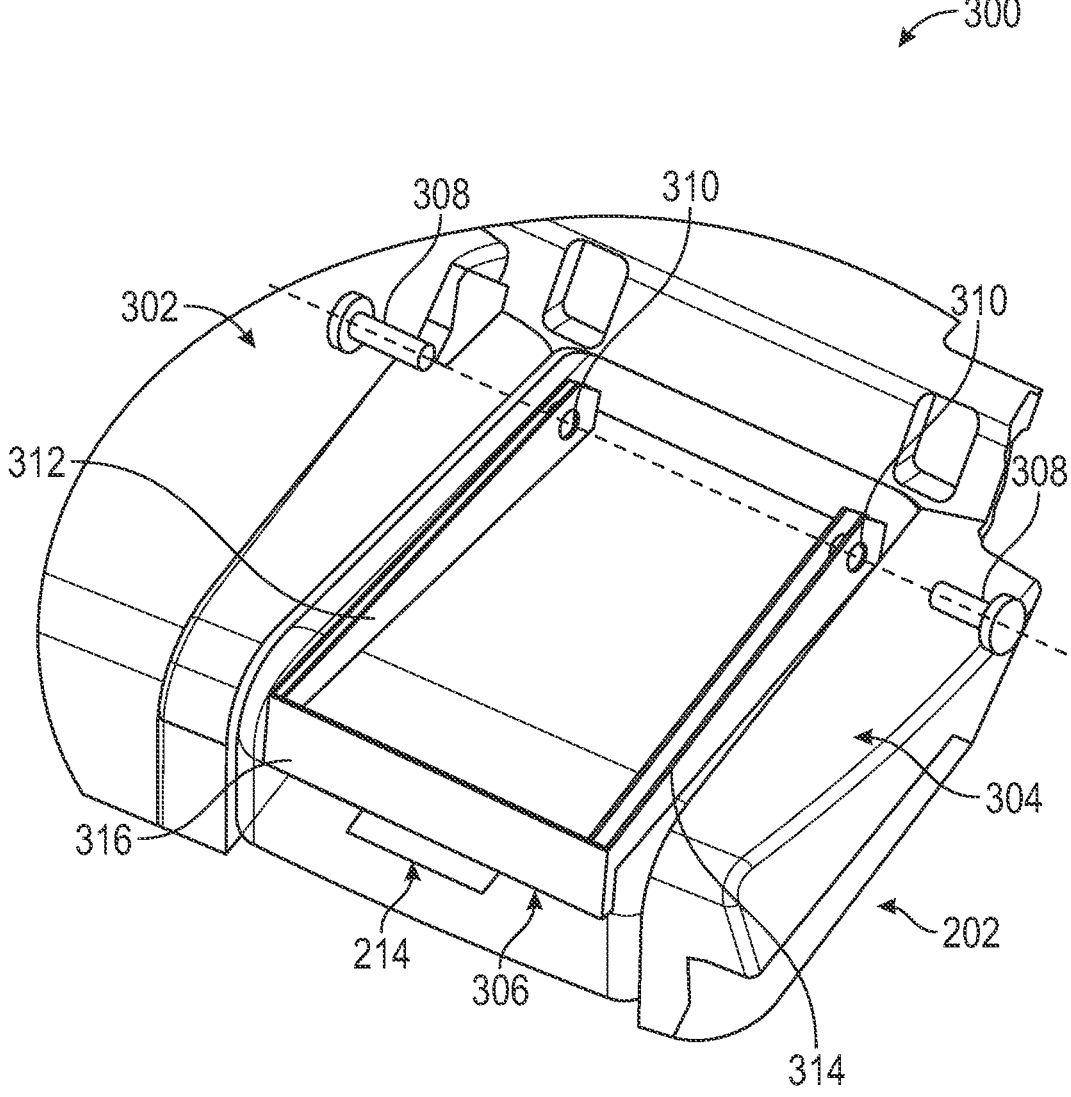
FIG. 3 shows a perspective view of a seat cushion of the seat assembly.

FIG. 3 shows a perspective view 300 of the seat cushion 202, with the cushion insert 208 removed. The seat cushion 202 includes a right bolster 302 and a left bolster 304, where "right" and "left" correspond to the reference frame of a person sitting the seat assembly 22. A cushion insert frame 306 is hingedly attached to the seat cushion 202 at the back end via fasteners 308. The cushion insert frame 306 includes a right beam 312 and a left beam 314 attached to a front beam 316. Openings 310 in the right beam 312 and the left beam 314 allow the fasteners 308 to hingedly attach the back of the cushion insert frame 306 to the right bolster 302 and the left bolster 304. The adjuster mechanism 214 is shown at the front of the cushion insert frame 306.

Figure 4:
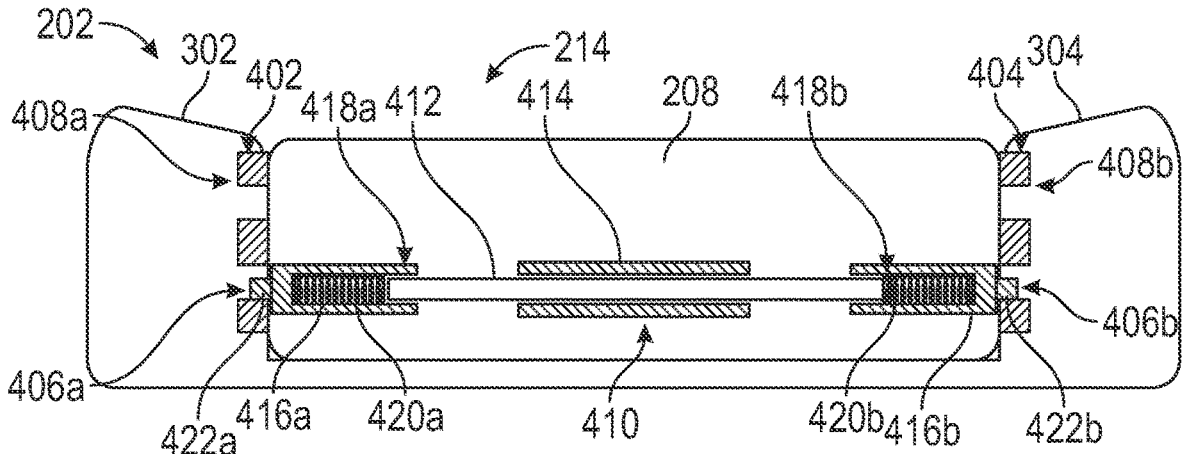
FIG. 4 shows a front view of an adjuster mechanism of the seat cushion in a first position.

FIG. 4 shows a front view 400 of the adjuster mechanism 214 of the seat cushion 202 in a first position. The seat cushion 202 includes a right bracket 402 that is part of the right bolster 302 and a left bracket 404 that is part of the left bolster 304. Each of the right bracket 402 and the left bracket 404 includes a plurality of holes arranged vertically or along a circumference of a circle having its origin at the fasteners 308. A first right hole 406a and a second right hole 408a are shown in the right bracket 402 and a first left hole 406b and a second left hole 408b are shown in the left bracket 404, for illustrative purposes. The second right hole 408a is higher than the first right hole 406a and the second left hole 408b is higher than the first left hole 406b. The first right hole 406a is aligned with the first left hole 406b along a horizontal line and the second right hole 408a is aligned with the second left hole 408b along a horizontal line.

The adjuster mechanism 214 includes a locking device 410 for engaging and disengaging the right bracket 402 and the left bracket 404. The locking device 410 includes a rod 412 attached to the cushion insert 208 or cushion insert frame 306 via a support 414. The rod 412 lies horizontally and, in the first position of the cushion, is aligned with opposing holes (e.g., first right hole 406a and first left hole 406b). A right barrel 416a (or right cap) is disposed at a right end 418a of the rod 412 and includes a right spring 420a that apples a biasing force that biases the right barrel away from the right end. The right barrel 416a includes a right pin 422a at its outer surface end for insertion into the holes (e.g., first right hole 406a) of the right bracket 402.

Similarly, a left barrel 416b (or left cap) is disposed at left end 418b of the rod 412 and includes a left spring 420b that apples a biasing force that biases the second barrel away from the second end. The left barrel 416b includes a left pin 422b at its outer surface end for insertion into the holes (e.g., first left hole 406b) of the left bracket 404.

In the first position, the cushion insert 208 is in a "down" position with respect to the seat cushion 202. The right pin 422a is disposed within the first right hole 406a and the left pin 422b is disposed within the first left hole 406b.

Figure 5:
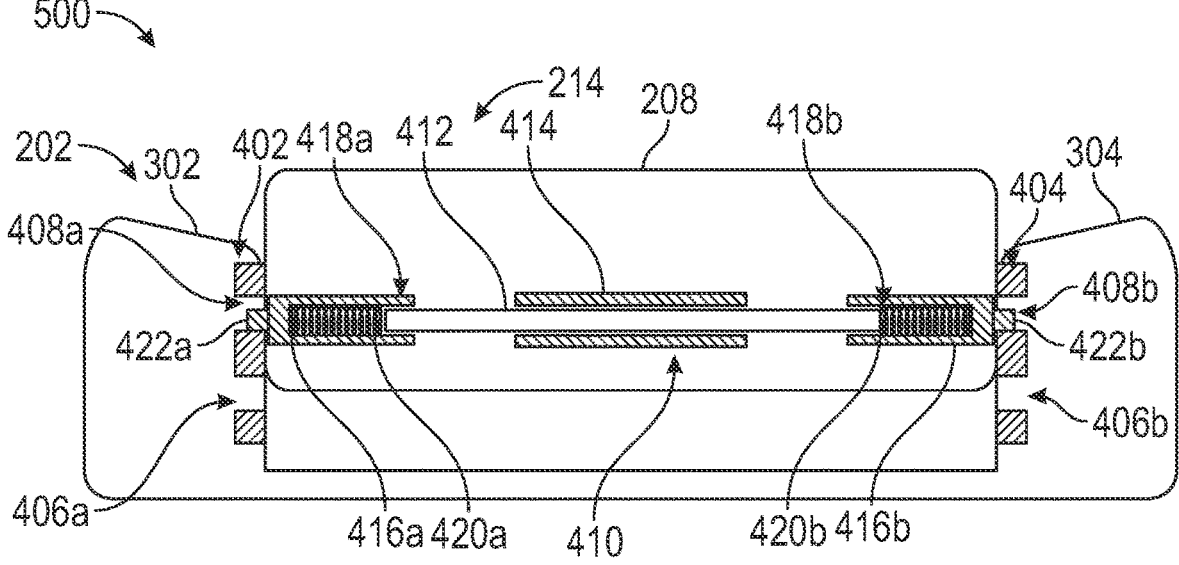
FIG. 5 shows a front view of the adjuster mechanism of the seat cushion in a second position.

FIG. 5 shows a front view 500 of the adjuster mechanism 214 of the seat cushion 202 in a second position. In the second position, the cushion insert 208 is in an "up" position with respect to the seat cushion 202. The right pin 422a is disposed within the second right hole 408a and the left pin 422b is disposed within the second left hole 408b.

Figure 6:
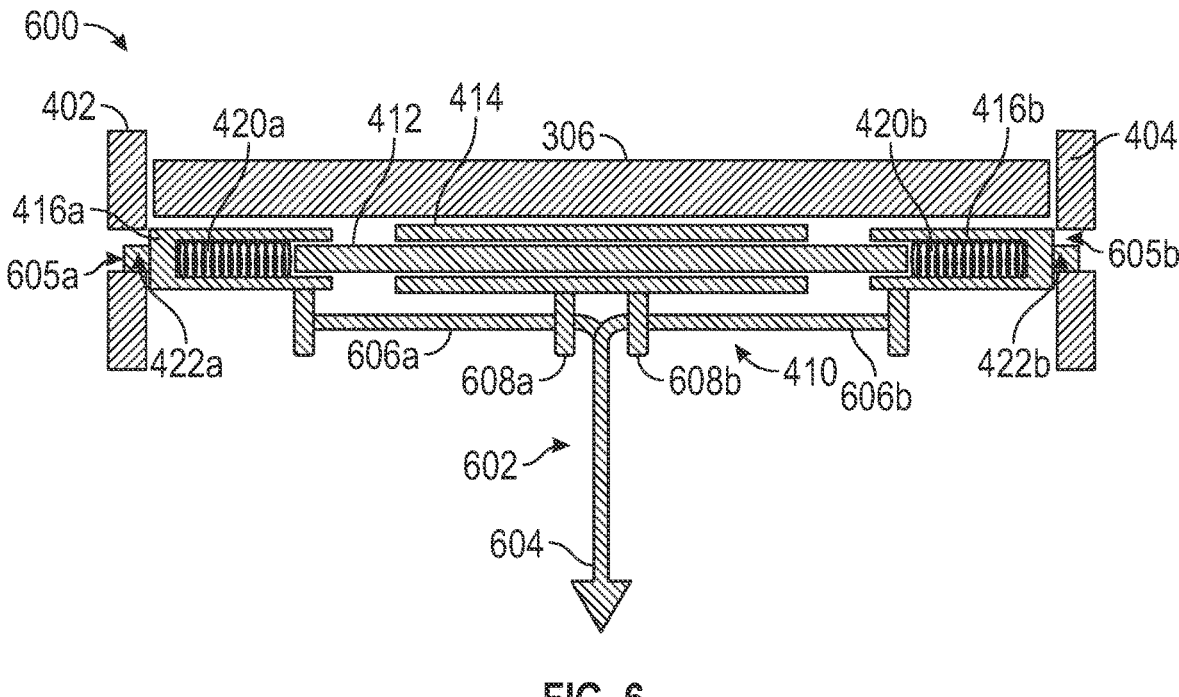
FIG. 6 shows a front view of a locking device, in a locked configuration.

FIG. 6 shows a detailed front view 600 of the locking device 410, in a locked configuration. The locking device 410 includes a strap 602 that can be pulled to disengage the locking device 410 from the right bracket 402 and left bracket 404. The strap 602 includes a first end 604 and a second end. The strap 602 splits at the second end to form a right branch 606a and a left branch 606b. The right branch 606a is coupled to the right barrel 416a and the left branch 606b is coupled to the left barrel 416b. The right branch 606a passes through a first guide hole 608a of the support 414 and the left branch 606b passes through a second guide hole 608b of the support 414.

In FIG. 6, the strap 602 is shown in a relaxed state, thereby allowing the right spring 420a to force the first barrel 616a outward with respect to the rod 412 to place the right pin 422a within a right hole 605a. Also, the left spring 420b forces the left barrel 616b outward with respect to the rod 412 to place the left pin 422b within a left hole 605b.

Figure 7:
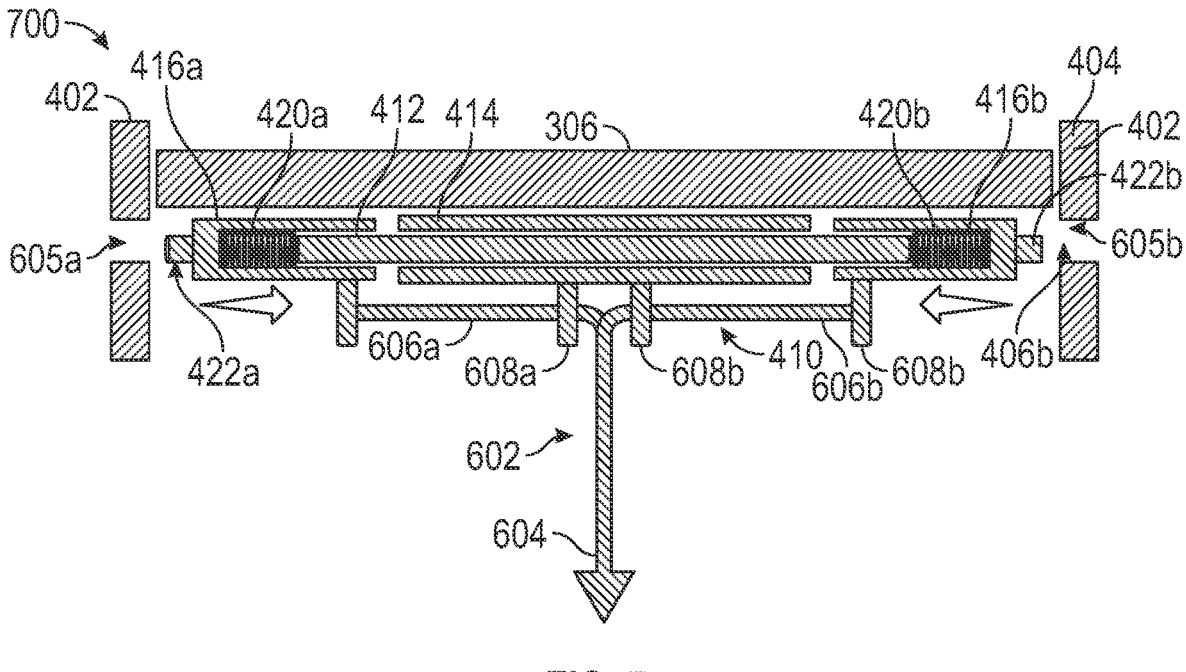
FIG. 7 shows a front view of the locking device, in an unlocked configuration.

FIG. 7 shows a front view 700 of the locking device 410, in an unlocked configuration. By pulling on the strap 602, the right branch 606a pulls the right barrel 416a inward against the rod 412, thereby applying a countering force that compresses the right spring 420a and disengages the right pin 422a from the right hole 605a. Similarly, the left branch 606b pulls the left barrel 416b inward against the rod 412, thereby applying a countering force that compresses the left spring 420*b* and disengages the left pin 422*b* from the left hole 605*b*.

Figure 8:
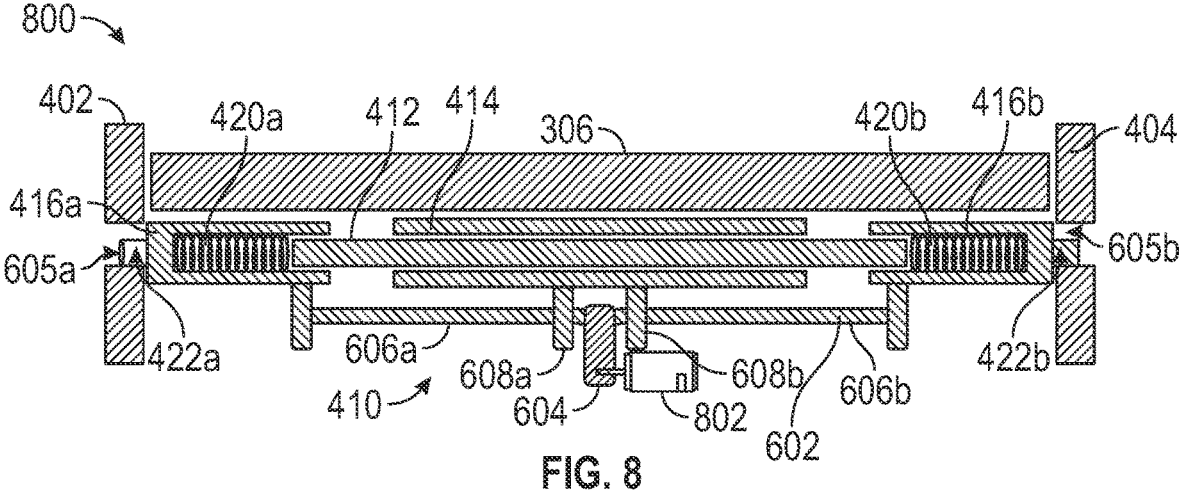
FIG. 8 shows a front view of the locking device, in an alternative embodiment, in a locked configuration.

FIG. 8 shows a front view 800 of the locking device 410, in an alternative embodiment, in a locked configuration. The first end 604 of the strap 602 is coupled to a motor 802. The motor 802 can be activated by a switch controlled by a user. The locking device 410 is shown with the motor 802 in a configuration in which the strap 602 is loose.

Figure 9:
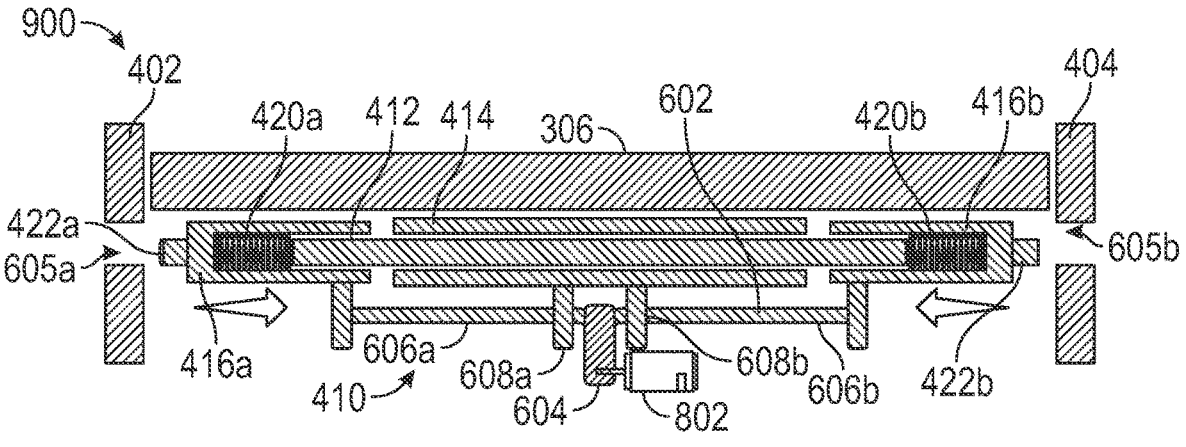
FIG. 9 shows a front view of the locking device in the alternative embodiment, in an unlocked configuration.

FIG. 9 shows a front view 900 of the locking device 410 in an alternative embodiment, in an unlocked configuration. The motor 802 can be activated in a first direction to pull on the strap 602, thereby extracting the right pin 422*a* and the left pin 422*b* from the right hole 605*a* and the left hole 605*b*, respectively, and freeing the cushion insert frame 306 from the right bracket 402 and the left bracket 404 for the purposes of adjusting the height of the cushion insert. The motor 802 can also be activated in a second direction opposite the first direction to release or loosen the strap 602, thereby causing the right spring 420*a* and left spring 420*b* to push the right barrel 416*a* and the left barrel 416*b* outward, respectively, thereby engaging the right pin 422*a* and the left pin 422*b* into right hole 605*a* and left hole 605*b*, respectively, as shown in FIG. 8.

Figures 10, 11:
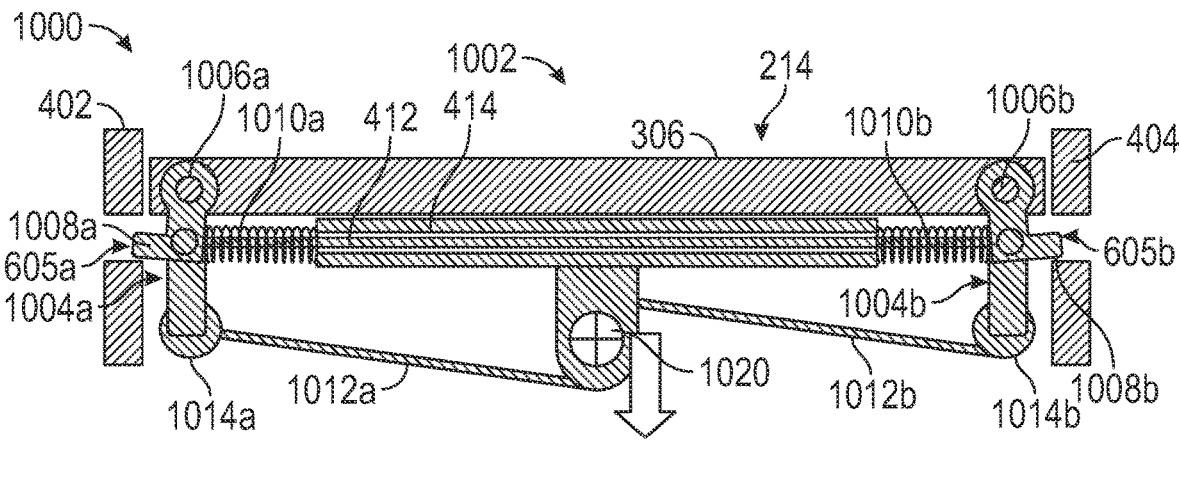
FIG. 10 shows a front view of a hinged locking device for the adjuster mechanism in a locked configuration.
FIG. 11 shows a front view of the hinged locking device in an unlocked configuration.

FIG. 10 shows a front view 1000 of a hinged locking device 1002 for the adjuster mechanism 214 in a locked configuration. The hinged locking device 1002 includes the rod 412 and support 414 for connecting the rod to the cushion insert frame 306. A right lever arm 1004*a* is coupled at one end to a right hinge 1006*a* at a right side of the cushion insert frame 306. The right lever arm 1004*a* includes a right pin 1008*a* which can be engaged to or disengaged from the right hole 605*a*. A right spring 1010*a* between the right lever arm 1004*a* and a right end of the rod 412 biases the right lever arm to rotate outward about the right hinge 1006*a* to engage the right pin 1008*a* into the right hole 605*a*. Similarly, a left lever arm 1004*b* is coupled at one end to a left hinge 1006*b* of the cushion insert frame 306. The left lever arm 1004*b* includes a left pin 1008*b* which can be engaged to or disengaged from the left hole 605*b*. A left spring 1010*b* between the left lever arm 1004*b* and a left end of the rod 412 biases the left lever arm to rotate outward about the left hinge 1006*b* to engage the left pin 1008*b* into the left hole 605*b*.

A right strap 1012*a* connects a free end 1014*a* of the right lever arm 1004*a* to a rotary device 1020. Similarly, a left strap 1012*b* connects a free end 1014*b* of the left lever arm 1004*b* to the rotary device 1020. As shown in FIG. 10, the locking device is in a locked configuration, with straps relaxed.

FIG. 11 shows a front view 1100 of the hinged locking device 1002 in an unlocked configuration. A user can manually rotate the rotary device 102 to pull on the right strap 1012*a* and the left strap 1012*b*. The right strap 1012*a* pulls the right lever arm 1004*a* inward to compress the right spring 1010*a* and disengage right pin 1008*a* from the right hole 605*a*. The left strap 1012*b* pulls the left lever arm 1004*b* inward to compress the left spring 1010*b* and disengage left pin 1008*b* from the left hole 605*b*.

Figure 12:
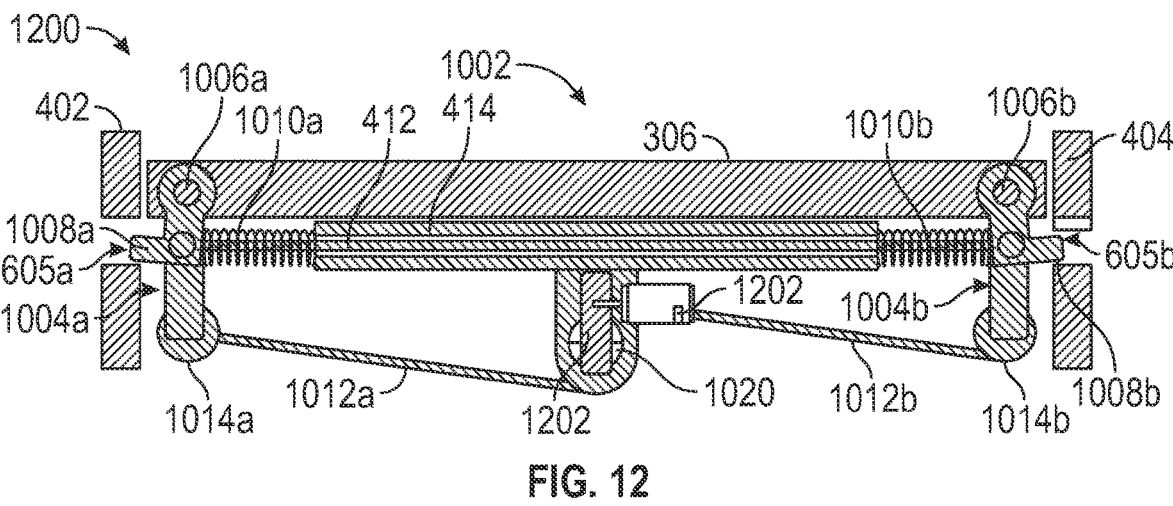
FIG. 12 shows a front view of the hinged locking device in an alternative embodiment, with the locking device is in a locked configuration.

FIG. 12 shows a front view 1200 of the hinged locking device 1002 in an alternative embodiment, with the locking device is in a locked configuration, The rotary device 1020 is coupled to a motor 1202. The motor 1202 can be activated by a switch controlled by a user.

Figure 13:
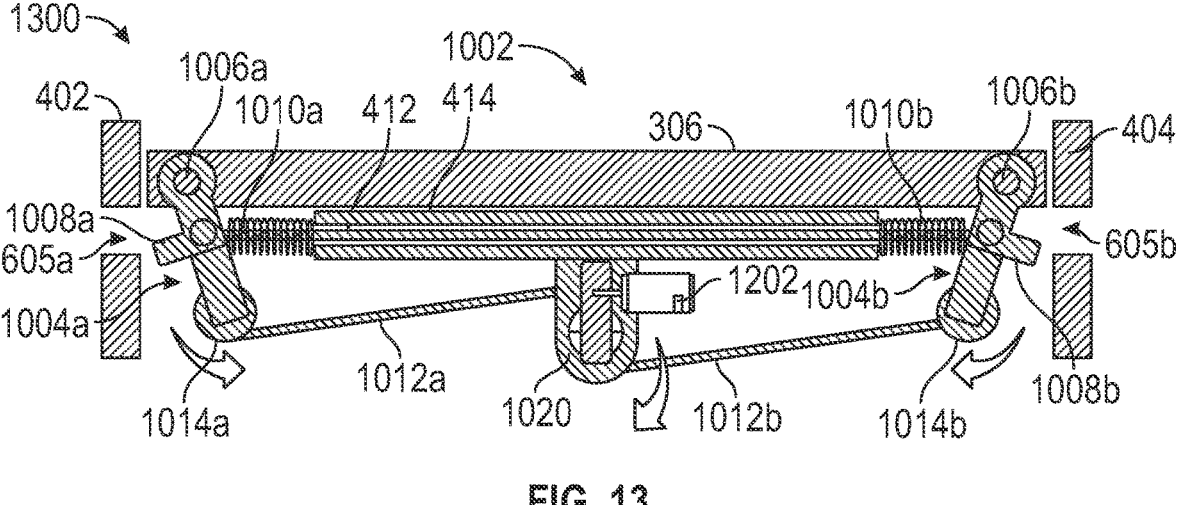
FIG. 13 shows a front view of the hinged locking device in an unlocked configuration.

FIG. 13 shows a front view 1300 of the hinged locking device 1002 in an unlocked configuration. The motor 1202 rotates the rotary device 1020 to pull on the right strap 1012*a* and the left strap 1012*b*, thereby disengaging the right pin 1008*a* from the right hole 605*a* and the left pin 1008*b* from the left hole 605*b*.

Figure 14:
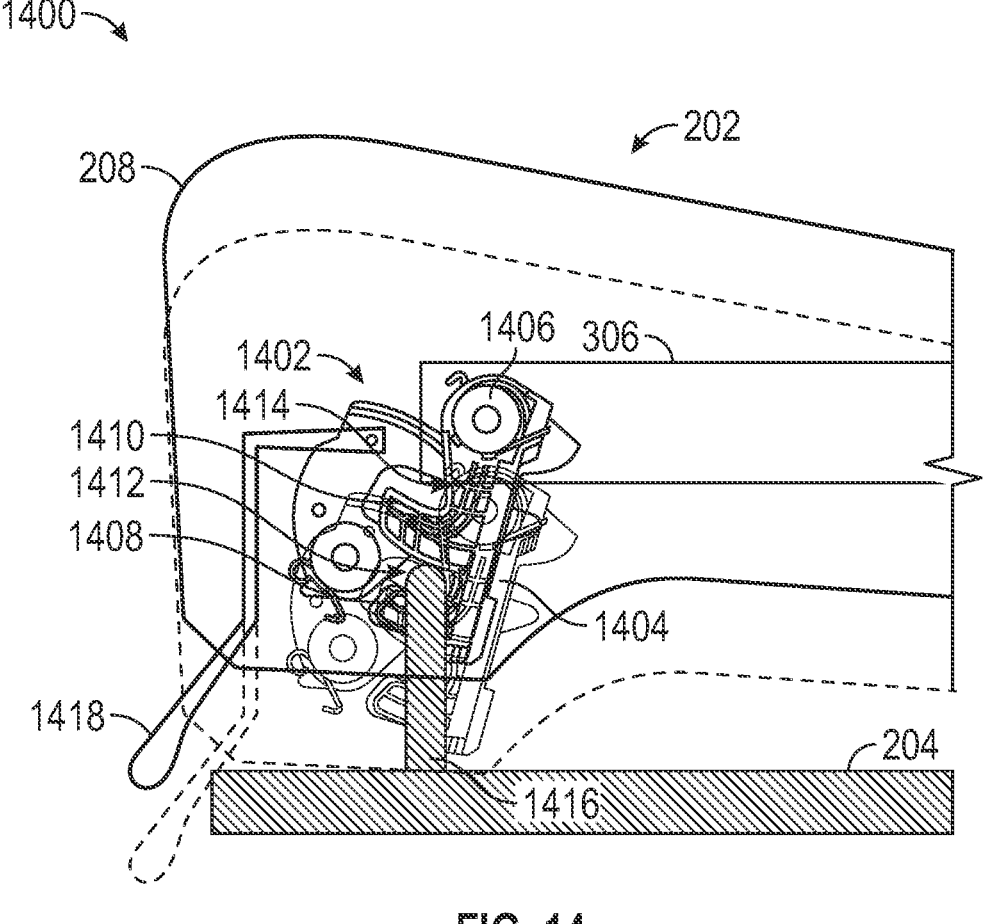
FIG. 14 shows a side view of the seat cushion depicting a first latch mechanism for changing a height of a cushion insert.

FIG. 14 shows a side view 1400 of the seat cushion 202 depicting a first latch mechanism 1402 for changing a height of a cushion. The first latch mechanism 1402 includes a latch 1404 that is rotatably coupled to the cushion insert frame 306 via a hinge 1406. The latch 1404 can rotate about the hinge 1406 to move in a forward and a backward direction. The latch 1404 includes a first hook 1408 and a second hook 1410 above the first hook, with each hook pointing towards a front of the seat cushion 202. The first hook 1408 forms a first recess 1412 and the second hook 1410 forms a second recess 1414. A loop 1416 is attached to the floor 204. The latch 1404 can be brought forward to catch a horizontal section of the loop 1416 in either the first recess 1412 or the second recess 1414. A handle 1418 is used to lock and unlock the latch 1404. The handle 1418 can be placed in a first position to lock the latch 1404 in place and in a second position to allow the latch to rotate freely about the hinge 1406. Once the cushion insert 208 is adjusted to a desirable height, the latch 1404 is brought forward to catch the horizontal section of the loop 1416 and the handle 1418 is placed in the first position to lock the latch in place.

Figure 15:
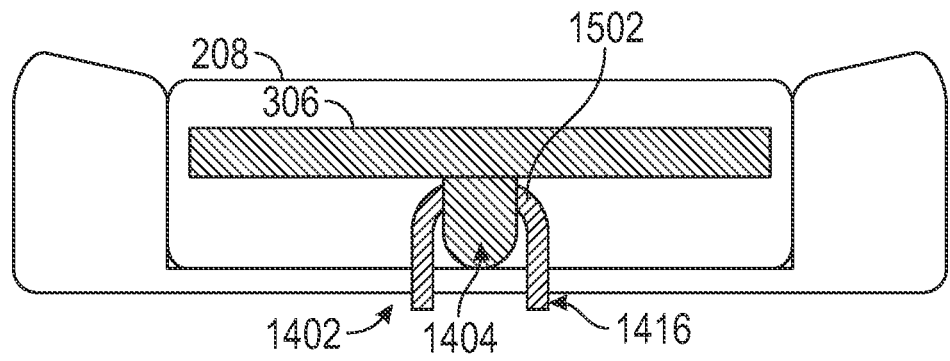
FIG. 15 shows a front view of the first latch mechanism in a first configuration.

FIG. 15 shows a front view 1500 of the first latch mechanism 1402 in a first configuration. The cushion insert 208 is in a "down" position with the horizontal section 1502 of the loop 1416 residing in the second recess (1414, FIG. 14) (i.e., the upper recess).

Figure 16:
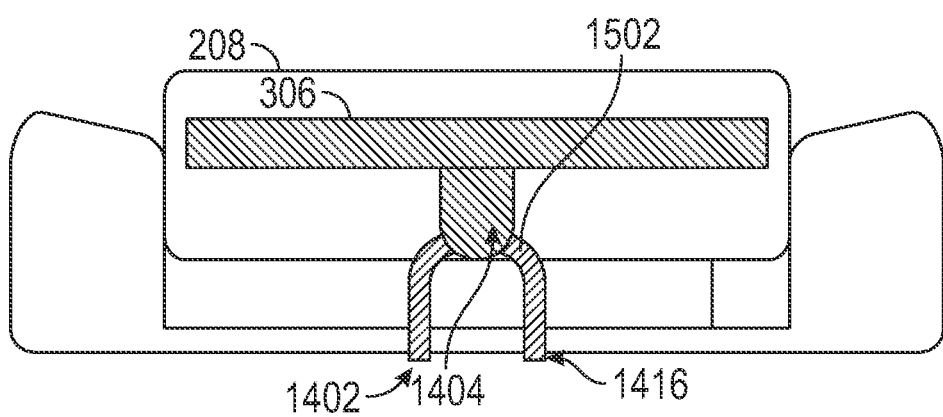
FIG. 16 shows a front view of the first latch mechanism in a second configuration.

FIG. 16 shows a front view 1600 of the first latch mechanism 1402 in a second configuration. The cushion insert 208 is in an "up" position with the horizontal section 1502 of the loop 1416 residing in the first recess (1412, FIG. 14) (i.e., lower recess).

Figure 17:
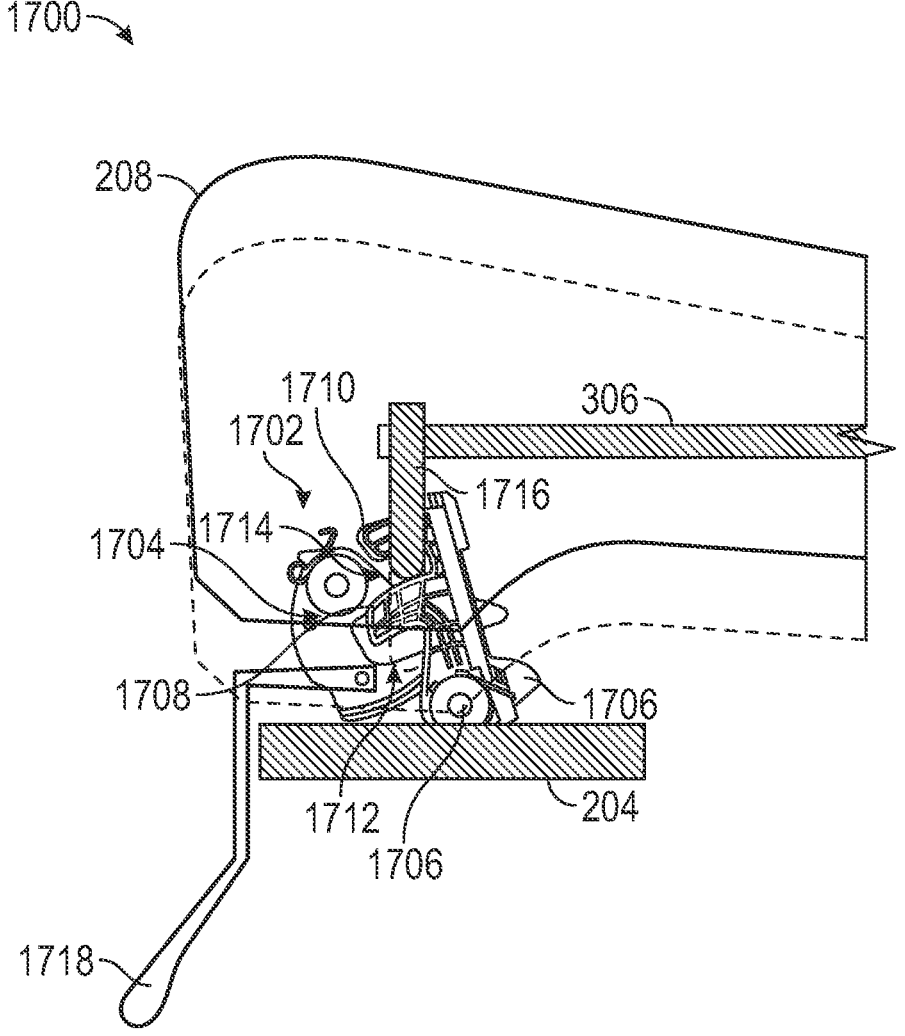
FIG. 17 shows a side view of a second latch mechanism for changing a height of a cushion insert.

FIG. 17 shows a side view 1700 of a second latch mechanism 1702 for changing a height of a cushion insert 208. The second latch mechanism 1702 includes a latch 1704 attached to the floor 204 via a hinge 1706. The latch 1704 is rotatable in the forward and backward direction about the hinge 1706. The latch 1704 includes a first hook 1708 and a second hook 1710 above the first hook. Both hooks are pointing toward the rear of the seat cushion. The first hook 1708 forms a first recess 1712 and the second hook 1710 forms a second recess 1714.

A loop 1716 is attached to the cushion insert frame 306. The latch 1704 can be brought forward to catch a horizontal section of the loop 1716 in either the first recess 1712 or the second recess 1714. A handle 1718 can be placed in a first position to lock the latch 1704 in place and in a second position to allow the latch to rotate about the hinge 1706.

Figure 18:
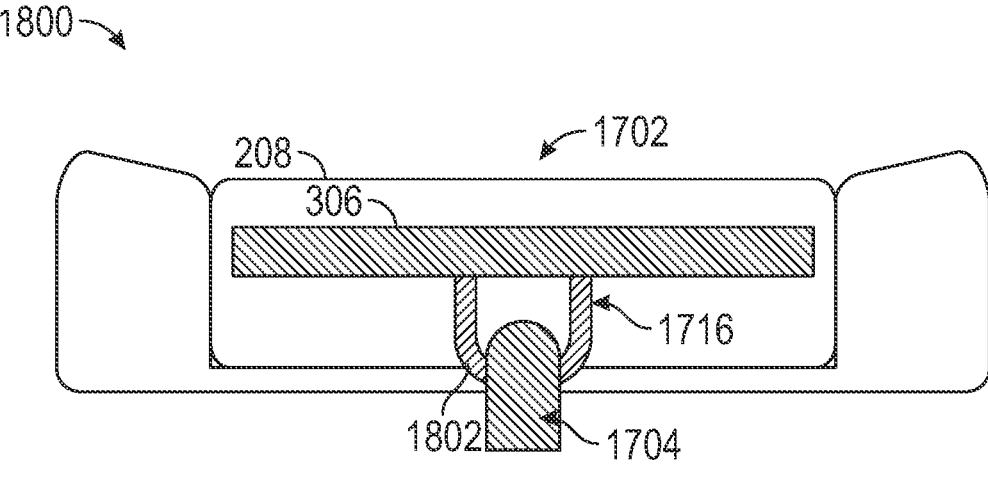
FIG. 18 shows a front view of the second latch mechanism in a first configuration.

FIG. 18 shows a front view 1800 of the second latch mechanism 1702 in a first configuration. The cushion insert 208 in a "down" position. The horizontal section 1802 of the loop 1716 is residing in the second recess (1714, FIG. 17) (i.e., the upper recess).

Figure 19:
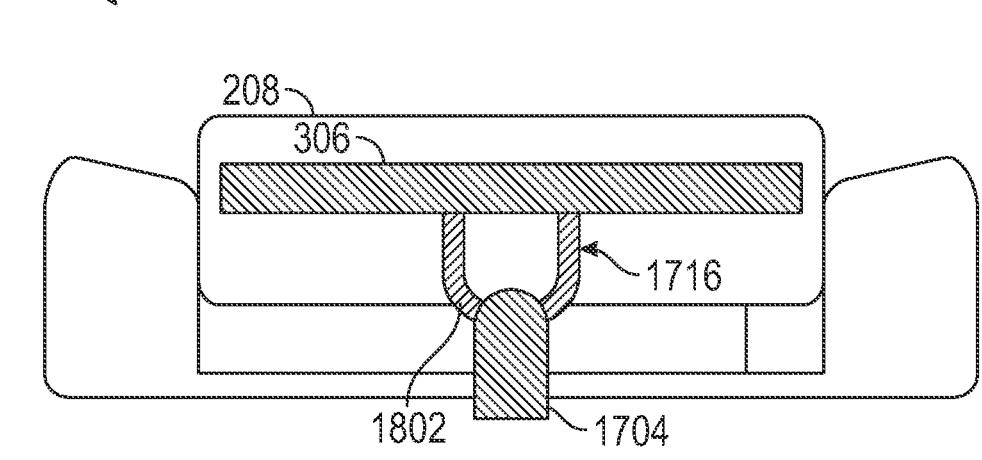
FIG. 19 shows a front view of the second latch mechanism in a second configuration.

FIG. 19 shows a front view 1900 of the second latch mechanism 1702 in a second configuration. The cushion insert 208 in an "up" position. The horizontal section 1802 of the loop 1716 is residing in the first recess (1712, FIG. 17) (i.e., the lower recess).

The terms "a" and "an" do not denote a limitation of quantity, but rather denote the presence of at least one of the referenced item. The term "or" means "and/or" unless clearly indicated otherwise by context. Reference through-out the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat assembly for a vehicle, comprising:
a seat cushion;
a cushion insert frame rotatably coupled to the seat cushion, the cushion insert frame having a right bracket and a left bracket; and
a locking device for engaging the cushion insert frame to the seat cushion and for disengaging the cushion insert frame from the seat cushion to allow for adjusting an angle of the cushion insert frame with respect to the seat cushion; the locking device comprising:
a rod coupled to the cushion insert frame, the rod including a right end and a left end;
a right barrel at the right end;
a right spring for biasing the right barrel away from the right end;
a left barrel at the left end;
a left spring for biasing the left barrel away from the left end; and
a strap coupled to the right barrel and the left barrel, wherein the strap is pullable to pull the right barrel against the right end by compressing the right spring and to pull the left barrel against the left end by compressing the left spring.

2. The seat assembly of claim 1, wherein the right bracket includes a right hole and the left bracket includes a left hole and the right spring applies a biasing force against the right barrel to engage a right pin of the right barrel into the right hole and the left spring applies a biasing force against the left barrel to engage a left pin of the left barrel into the left hole.

3. The seat assembly of claim 2, further comprising a motor for applying a countering force at the strap to pull the right barrel against the right end to remove the right pin from the right hole and to pull the left barrel against the left end to remove the left pin from the left hole.

4. The seat assembly of claim 1, wherein the cushion insert frame includes a right lever arm hingedly attached to the cushion insert frame and a left lever arm hingedly attached to the cushion insert frame, wherein the right spring applies a first biasing force against the right lever arm and the left spring applies a second biasing force against the left lever arm, and the strap is pullable to apply a countering force on the right lever arm and the left lever arm.

5. The seat assembly of claim 4, further comprising a rotary device for pulling the strap.

6. The seat assembly of claim 5, further comprising a motor for rotating the rotary device.

7. The seat assembly of claim 1, further comprising a horizontal bar attached to a floor of the vehicle and a latch hingedly attached to the cushion insert frame, the latch including at least a first recess and a second recess for receiving the horizontal bar and a handle for locking the latch in place.

8. The seat assembly of claim 1, further comprising a horizontal bar attached to the cushion insert frame and a latch hingedly attached to a floor of the vehicle, the latch including at least a first recess and a second recess for receiving the horizontal bar and a handle for locking the latch in place.

9. The seat assembly of claim 1, wherein the locking device is disposed at a front end of the cushion insert frame.

10. The seat assembly of claim 1, wherein the strap includes a right branch that passes through a right guide hole to couple to the right barrel and a left branch that passes through a left guide hole to couple to the left barrel.

11. A vehicle, comprising:
a seat cushion;
a cushion insert frame rotatably coupled to the seat cushion, the cushion insert frame having a right bracket and a left bracket; and
a locking device for engaging the cushion insert frame to the seat cushion and for disengaging the cushion insert frame from the seat cushion to allow for adjusting an angle of the cushion insert frame with respect to the seat cushion; the locking device comprising:
a rod coupled to the cushion insert frame, the rod including a right end and a left end;
a right barrel at the right end;
a right spring for biasing the right barrel away from the right end;
a left barrel at the left end;
a left spring for biasing the left barrel away from the left end; and
a strap coupled to the right barrel and the left barrel, wherein the strap is pullable to pull the right barrel against the right end by compressing the right spring and to pull the left barrel against the left end by compressing the left spring.

12. The vehicle of claim 11, wherein the right bracket includes a right hole and the left bracket includes a left hole and the right spring applies a first biasing force against the right barrel to engage a right pin of the right barrel into the right hole and the left spring applies a second biasing force against the left barrel to engage a left pin of the left barrel into the left hole.

13. The vehicle of claim 12, further comprising a motor for applying a countering force at the strap to pull the right barrel against the right end to remove the right pin from the right hole and to pull the left barrel against the left end to remove the left pin from the left hole.

14. The vehicle of claim 11, wherein the cushion insert frame includes a right lever arm hingedly attached to the cushion insert frame and a left lever arm hingedly attached to the cushion insert frame, wherein the right spring applies a first biasing force against the right lever arm and the left spring applies a second biasing force against the left lever arm, and the strap is pullable to apply a countering force on the right lever arm and the left lever arm.

15. The vehicle of claim 14, further comprising a rotary device for pulling the strap.

16. The vehicle of claim 15, further comprising a motor for rotating the rotary device.

17. The vehicle of claim 11, further comprising a horizontal bar attached to a floor of the vehicle and a latch hingedly attached to the cushion insert frame, the latch including at least a first recess and a second recess for receiving the horizontal bar and a handle for locking the latch in place.

18. The vehicle of claim 11, further comprising a horizontal bar attached to the cushion insert frame and a latch hingedly attached to a floor of the vehicle, the latch including at least a first recess and a second recess for receiving the horizontal bar and a handle for locking the latch in place.

19. The vehicle of claim 11, wherein the locking device is disposed at a front end of the cushion insert frame.

20. The vehicle of claim 11, wherein the strap includes a right branch that passes through a right guide hole to couple to the right barrel and a left branch that passes through a left guide hole to couple to the left barrel.

*    *    *    *    *